(12) United States Patent
Stamps et al.

(10) Patent No.: US 7,828,525 B2
(45) Date of Patent: Nov. 9, 2010

(54) SOFT IN-PLANE TILTROTOR HUB

(75) Inventors: Frank B. Stamps, Colleyville, TX (US); Michael R. Smith, Colleyville, TX (US); Christopher M. Bothwell, Grapevine, TX (US); Lawrence M. Corso, Keller, TX (US); James L. Braswell, Jr., Colleyville, TX (US); David A. Popelka, Colleyville, TX (US); Ernst C. Schellhase, Benbrook, TX (US); Charles L. Hollimon, North Richland Hills, TX (US); Thomas J. Newman, Midlothian, TX (US); Bryan Baskin, Arlington, TX (US); Thomas C. Campbell, Keller, TX (US); Daniel B. Robertson, Southlake, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 181 days.

(21) Appl. No.: 10/567,886

(22) PCT Filed: Aug. 27, 2004

(86) PCT No.: PCT/US2004/027990

§ 371 (c)(1),
(2), (4) Date: Feb. 9, 2006

(87) PCT Pub. No.: WO2005/049421

PCT Pub. Date: Jun. 2, 2005

(65) Prior Publication Data
US 2008/0247876 A1     Oct. 9, 2008

(51) Int. Cl.
*B64C 27/51*     (2006.01)

(52) U.S. Cl. .................... 416/134 A; 416/107; 416/140; 416/141; 416/148; 188/282.1; 188/283; 188/266.3; 188/299.1; 188/319.2; 188/322.15

(58) Field of Classification Search ................. 416/106, 416/107, 134 A, 140, 141, 148–150; 244/17.11; 188/282.1, 322.15, 299.1, 319.2, 283, 266.3
See application file for complete search history.

(56) References Cited

U.S. PATENT DOCUMENTS 2,155,427 A * 4/1939 Larsen ........................ 416/106
2,754,937 A * 7/1956 Buivid ........................ 188/313
2,774,553 A * 12/1956 Jensen ..................... 244/17.17

(Continued)

FOREIGN PATENT DOCUMENTS

GB          713352          8/1954

(Continued)

*Primary Examiner*—Christopher Verdier
(74) *Attorney, Agent, or Firm*—James E. Walton

(57) ABSTRACT

A rotor hub assembly for a rotary-wing aircraft has a central member and a plurality of blade grips adapted for attaching rotor blades to the central member. The blade grips are pivotally attached to the central member and are capable of pivoting about a pivot axis generally normal to a plane of rotation of the blades. The pivoting allows for in-plane motion of the blades relative to the central member. A damper is operably connected to each blade grip for damping the in-plane motion of the associated blade, each damper being selectively switchable between at least two spring rates.

1 Claim, 6 Drawing Sheets

U.S. PATENT DOCUMENTS

| | | | | |
|---|---|---|---|---|
| 4,244,677 | A | * | 1/1981 | Noehren et al. ......... 416/134 A |
| 4,543,040 | A | * | 9/1985 | McArdle et al. ........ 416/134 A |

FOREIGN PATENT DOCUMENTS

| GB | 781356 | 8/1957 |
|---|---|---|
| GB | 871267 | 6/1961 |
| GB | 1075566 | 7/1967 |
| GB | 1235277 | 6/1971 |
| GB | 1333246 | 10/1973 |
| GB | 1394512 | 5/1975 |
| GB | 1427983 | 3/1976 |
| GB | 1427984 | 3/1976 |
| GB | 1500007 | 2/1978 |
| GB | 1514347 | 6/1978 |

* cited by examiner

SOFT IN-PLANE TILTROTOR HUB

GOVERNMENT LICENSE RIGHTS

The U.S. Government has a paid-up license in this invention and the right in limited circumstances to require the patent owner to license others on reasonable terms as provided for by the terms of Contract No. VGART NCC2-99086.

TECHNICAL FIELD

The present invention relates in general to the field of rotor hubs for aircraft. In particular, the present invention relates to soft in-plane rotor hubs.

DESCRIPTION OF THE PRIOR ART

Many aircraft rotors, especially those for helicopters and tiltrotor aircraft, include a lead/lag hinge designed to allow in-plane motion of a blade about an axis generally normal to the plane of rotation, such that the blade "runs in" or "gets behind" with respect to other blades. This is mainly to compensate for the extra rotational speed that comes with "blade flapping" and to compensate for differences in blade aerodynamic drag encountered at various moments of one rotational cycle.

To prevent excessive motion about the lead/lag hinge, dampers are normally incorporated in the design of this type of rotor system. The purpose of the dampers is to absorb the acceleration and deceleration of the rotor blades and maintain the frequency of the lead/lag motion within a desired range. Often, the damper is an elastomeric damper. Normally, the spring rate chosen for a lead/lag damper is a compromise between the value required for the desired in-plane stiffness and a value that reduces load and fatigue on the rotor and other aircraft components.

SUMMARY OF THE INVENTION

There is a need for an improved apparatus and improved methods for providing a rotor hub with variable in-plane stiffness.

Therefore, it is an object of the present invention to provide an improved apparatus and improved methods for providing a rotor hub with variable in-plane stiffness.

The present invention provides a rotor hub assembly for a rotary-wing aircraft, the rotor hub assembly having a central member and a plurality of blade grips adapted for attaching rotor blades to the central member. The blade grips are pivotally attached to the central member and are capable of pivoting about a pivot axis generally normal to a plane of rotation of the blades. The pivoting allows for in-plane motion of the blades relative to the central member. A damper is operably connected to each blade grip for damping the in-plane motion of the associated blade, each damper being selectively switchable between at least two spring rates.

The present invention provides significant advantages over the prior art, including: (1) providing a rotor hub having selectively switchable spring rates for lead/lag damping; (2) providing a small, lightweight switchable damper for use in the rotor hubs of the invention; and (3) providing a method of preventing ground resonance conditions while minimizing loads and fatigue on aircraft components.

BRIEF DESCRIPTION OF THE DRAWINGS

For a more complete understanding of the present invention, including its features and advantages, reference is now made to the detailed description of the invention taken in conjunction with the accompanying drawings in which like numerals identify like parts, and in which.

DESCRIPTION OF THE PREFERRED EMBODIMENT

Figure 1:
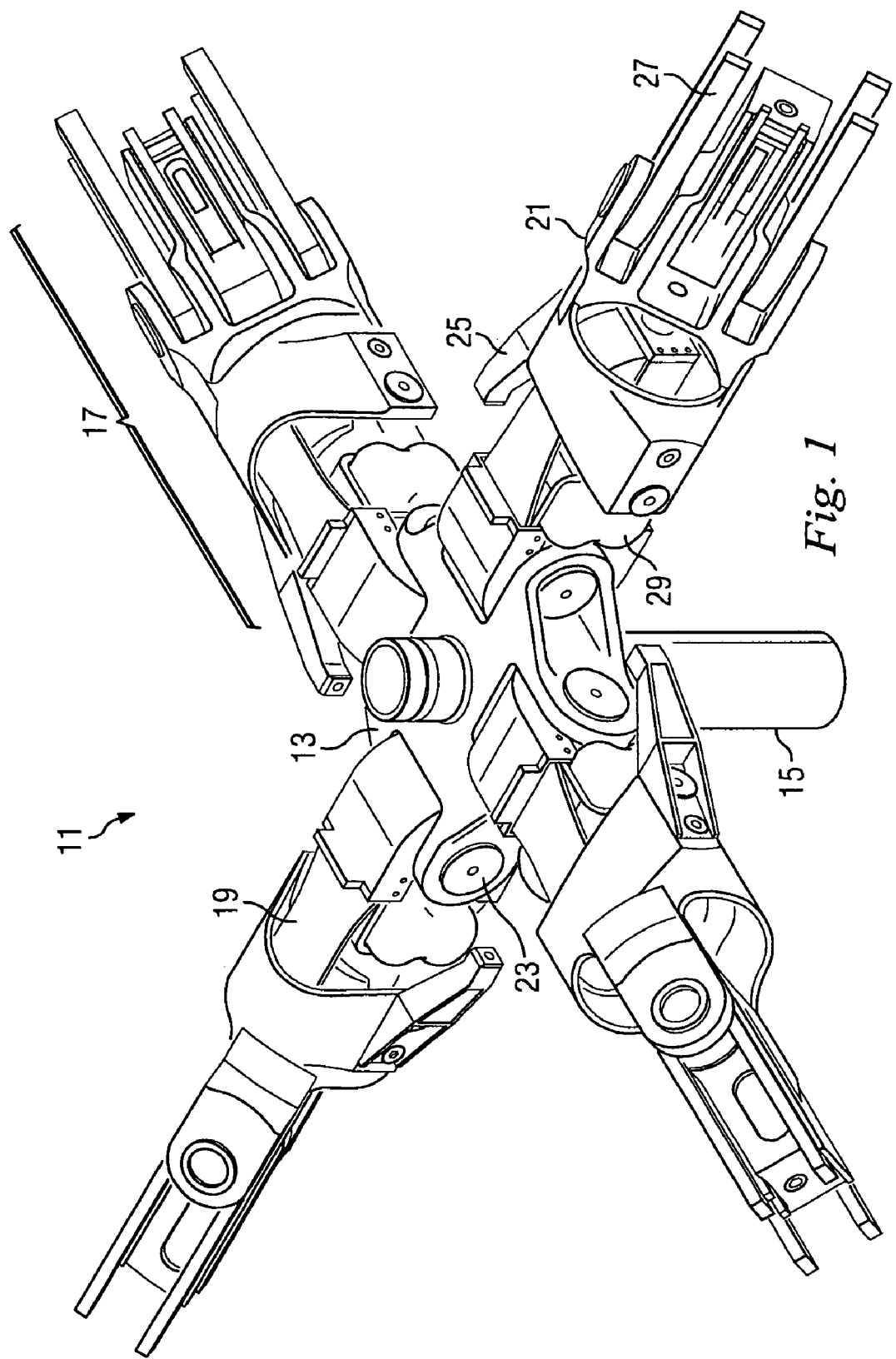
FIG. 1 is a perspective view of a four-blade aircraft rotor hub according to the present invention.

Referring to FIG. 1 in the drawings, a soft in-plane rotor hub 11 according to the present invention is illustrated. As shown, hub 11 is configured as a four-blade hub for use as a proprotor hub of a tiltrotor aircraft. Rotor hubs according to the invention may have more or fewer blades and may also be configured for use on other rotary-wing aircraft, including helicopters.

Hub 11 has a central member 13 which is adapted to fixedly receive mast 15. Mast 15 is rotated by torque from a drive unit, which may be routed through a transmission (not shown), and the torque is transferred through mast 15 to central member 13 for rotating hub 11. Blades (not shown) are attached to hub 11 with blade attachment assemblies 17, each assembly 17 comprising a blade attachment strap 19 and a blade grip 21. Straps 19 are circumferential and oriented vertically to extend out of the plane of rotation. Straps 19 are hingedly connected to central member 13 at flapping hinges 23, and blade grips 21 are rotatably and pivotally attached to the outer end of straps 19. Flapping hinges 23 allow for out-of-plane flapping motion of each blade about an axis generally parallel to the plane of rotation of hub 11. Blade grips 21 rotate relative to straps 19 about radial pitch axes that are generally parallel to the plane of rotation of hub 11, and a pitch horn 25 extends from the leading edge of each grip 21 for controlling the pitch of the associated blade. Pitch horns 25 combine with the associated flapping hinge 23 to yield the desired delta-3 pitch-flap coupling. In addition, each blade grip 21 is connected to strap 19 with a lead/lag bearing (not shown), and the grip 21 pivots relative to the associated strap 19 about a lead/lag axis generally normal to the plane of rotation of hub 11. This provides for chordwise, lead and lag motion of the blades in the plane of rotation of hub 11 about the lead/lag axis. Both the bearing for flapping hinge 23 and the lead/lag bearing are located within strap 19. The flapping hinge axis is located inboard, and the lead/lag axis is located outboard, the axes being non-coincident. Blade roots 27 are shown installed within the outer ends of grips 21.

To control the chordwise motion of blades about the lead/lag axis, a damper 29 is installed in each strap 19 and is operably connected to the associated blade grip 21. Dampers 29 are each preferably selectively switchable between at least two spring rates, allowing for hub 11 to be readily configured to have selected in-plane stiffness values. The advantage of selectable in-plane stiffness is that hub 11 can % be made stiff enough to prevent ground-resonance conditions when the aircraft is resting on a surface, yet hub 11 can be made softer during flight for minimizing loads and fatigue on components of hub 11 and other components of the aircraft. Dampers 29 are preferably switched through electric actuation, though other types of actuation may alternatively be used, and the switching of dampers 29 is preferably automatically controlled by aircraft control systems. For example, the aircraft control systems may switch dampers 29 to a stiffer setting upon a signal that the aircraft is within a selected proximity of the ground or upon a signal generated by sensors indicating contact of the landing gear with the ground.

Figure 2:
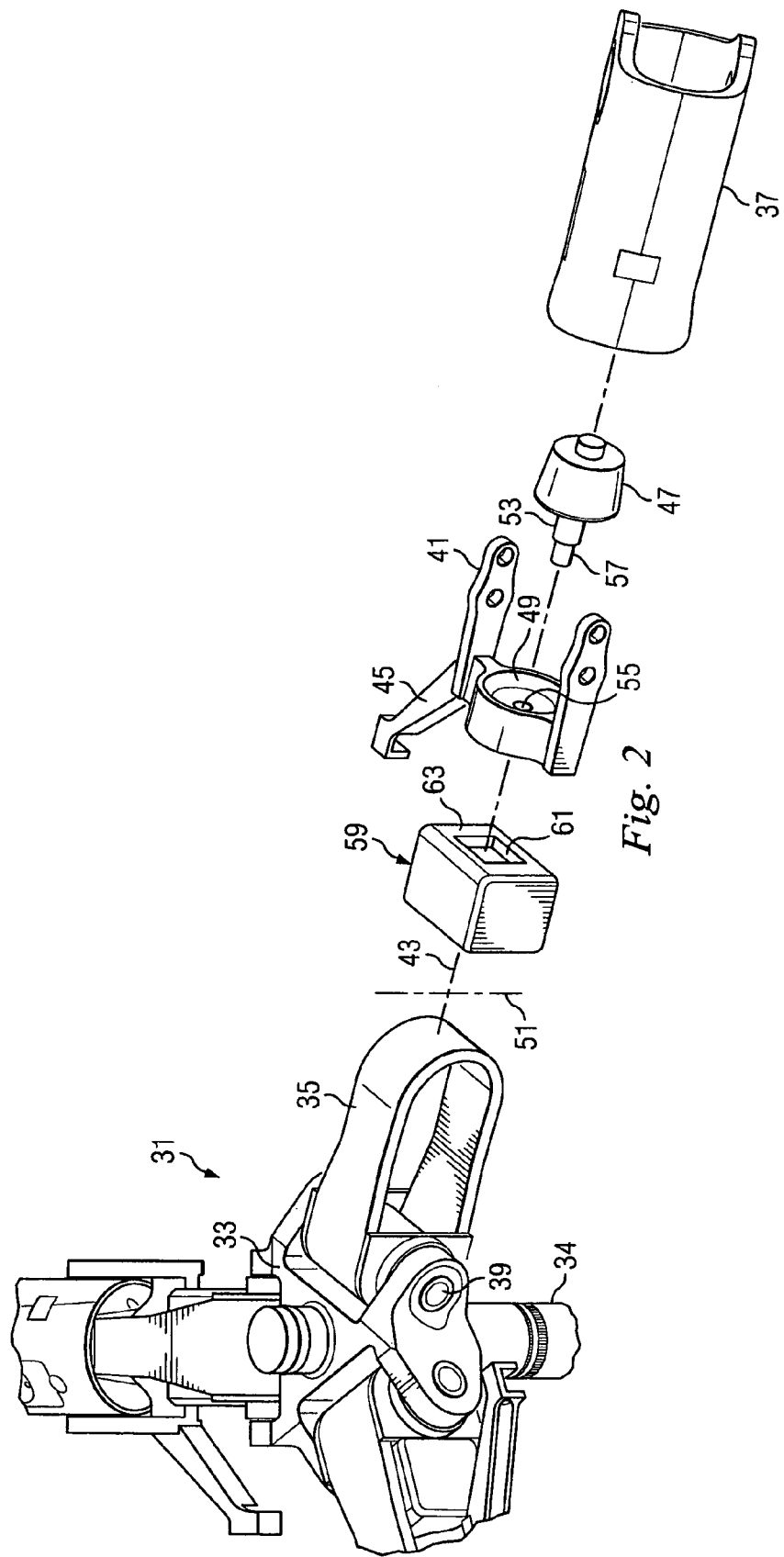
FIG. 2 is an exploded perspective view of a three-blade aircraft rotor hub according to the invention.
Figure 3:
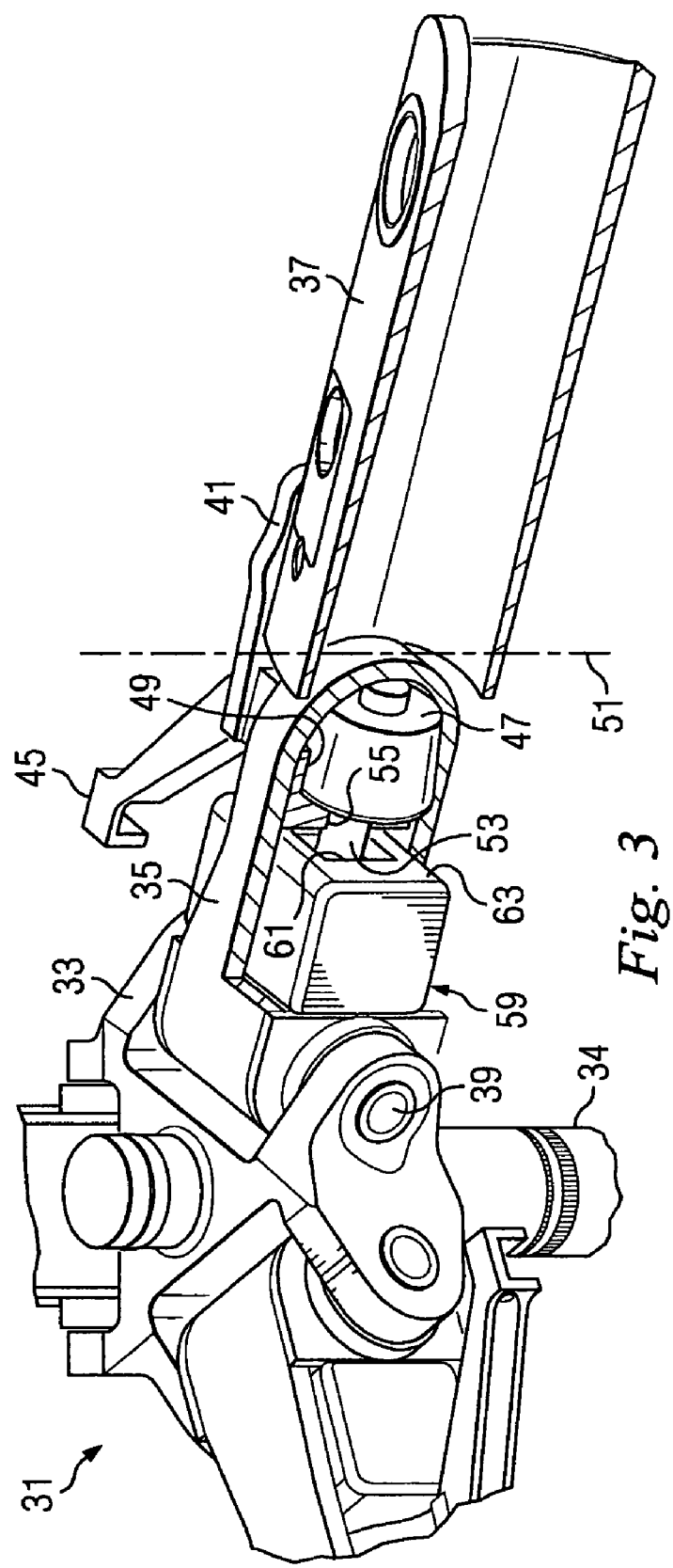
FIG. 3 is a partially sectioned perspective view of the rotor hub of FIG. 2.
Figure 4:
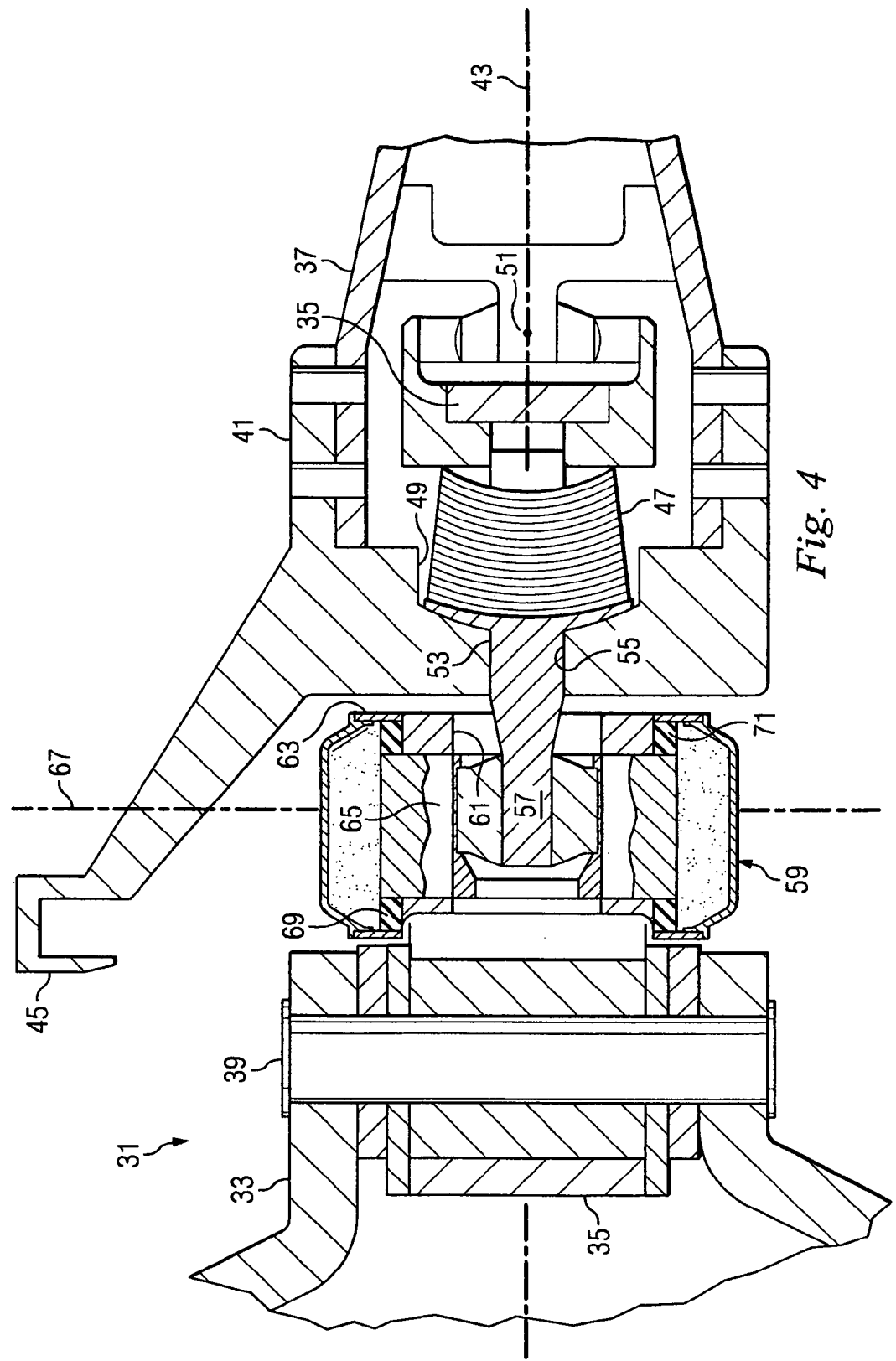
FIG. 4 is a cross-sectional plan view of a portion of the rotor hub of FIG. 2.

FIGS. 2 through 4 show a simplified, three-blade alternative embodiment of a rotor hub of the invention. FIG. 2 is an exploded view, FIG. 3 is a partial cutaway of the assembly, and FIG. 4 is a cross-sectional plan view of the assembly. Referring to these figures, hub 31 includes central member 33, blade straps 35, and blade grips 37. Central member 33 is adapted to fixedly receive mast 34. Straps 35 are circumferential and are hingedly connected to central member 33 at flapping hinge 39. This allows for out-of-plane flapping motion of blades (not shown) attached to blade grips 37. Each blade grip 37 receives the root end of a blade in the outer end of grip 37, and the inner end of each grip 37 is connected to the outer end of the associated strap 35 with pitch horn brackets 41. Each grip 37 can rotate about an associated pitch axis 43, and the pitch for the blades is controlled using pitch horns 45 on brackets 41. An elastomeric bearing 47 is received within a recess 49 of each bracket 41 to provide for in-plane, chordwise pivoting of brackets 41 and grips 37 about a lead/lag axis 51 passing through the focus of each bearing 47. Both elastomeric bearing 47 and flapping hinge 39 are located within strap 35, with the axes for these hinges being non-coincident. This configuration allow for better packaging of the components of hub 31, especially in tiltrotor applications.

As hub 31 is rotated by mast 34, centrifugal loads from the blades are transferred through grips 37 into brackets 41 and from brackets 41 into bearings 47. The loads are then transferred into straps 35 from bearings 47 and into central member 33 from straps 35. A post 53 protrudes from the inner end of each bearing 47, with post 53 extending through a bore 55 in recess 49 of the corresponding bracket 41. The inner end 57 of post 53 engages a multiple-spring-rate damper 59, post 53 extending into an opening 61 in the outer wall 63 of damper 59 and engaging piston 65. Though shown with an elastomeric bearing 47, hubs of the invention may be constructed in any appropriate configuration, including hubs using at least one pin or similar connection for the lead/lag hinge.

In-plane motion of a blade about the associated lead/lag axis 51 causes a proportional in-plane motion of post 53. Because post 53 is located inward of axis 51, the in-plane motion of post 53 is in the direction opposite the movement of the blade. This motion causes displacement of piston 65 along axis 67, which is resisted by the bulging and/or shearing deflection of elastomeric seals 69, 71. Each damper 59 is selectively switchable between at least two spring rates, including while hub 31 is in use, allowing hub 31 to be switched between at least two values of in-plane stiffness.

Figure 6:
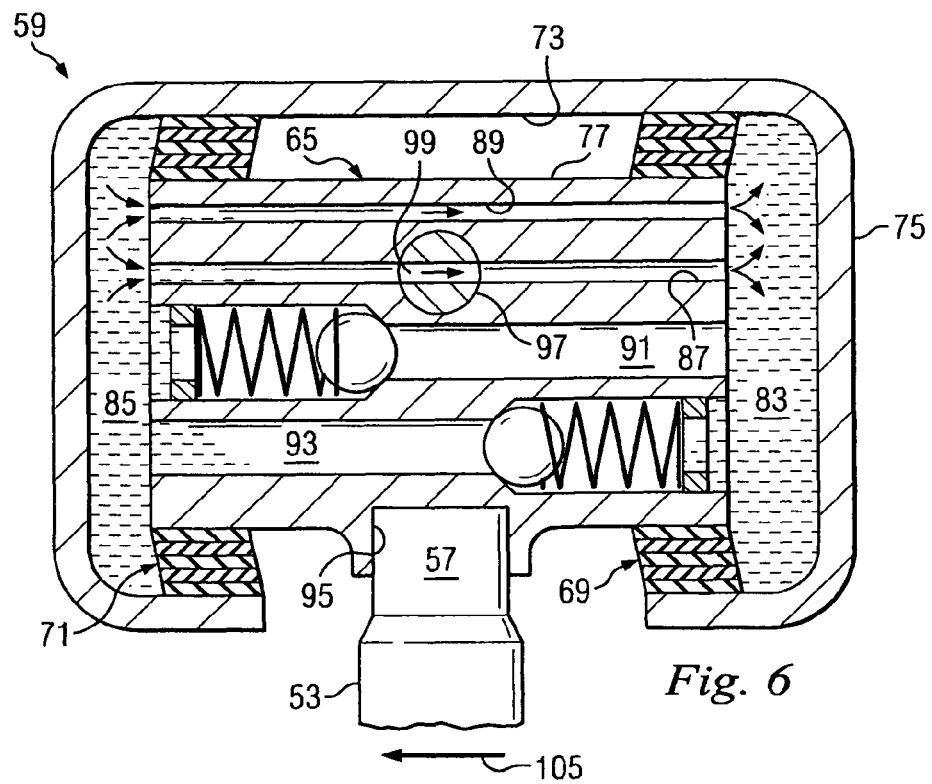
FIG. 6 is a cross-sectional plan view of the damper of FIG. 5, the damper being configured for a softer spring rate.
Figure 7:
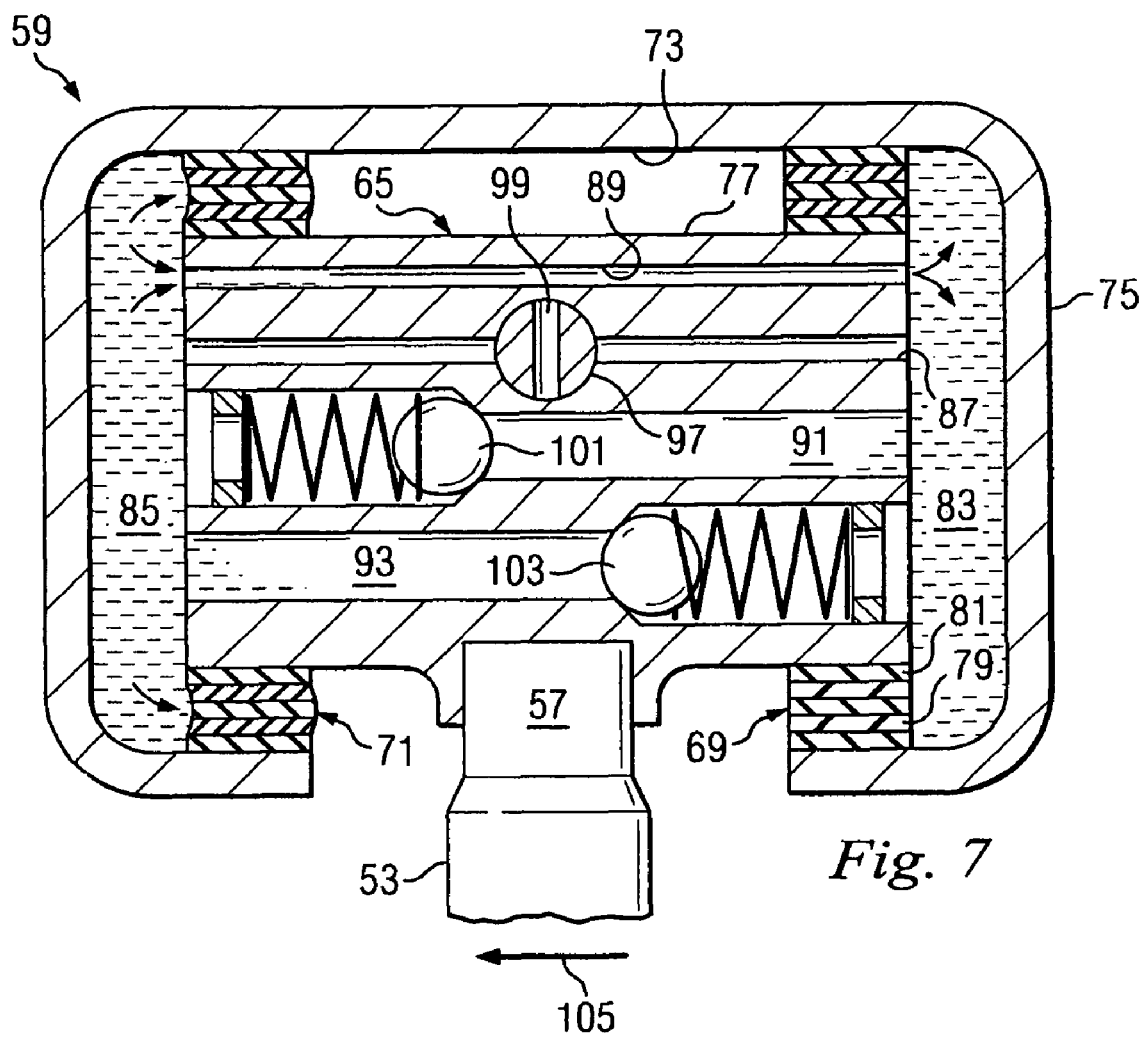
FIG. 7 is a cross-sectional plan view of the damper of FIG. 5, the damper being configured for a stiffer spring rate.

Damper 59, as shown in FIG. 4, is one example of a switchable, multi-spring-rate damper according to the present invention that can be used in hubs of the present invention, though other types of selectively switchable, multiple-spring-rate dampers may be used. A more detailed view of damper 59 is shown in FIGS. 5 through 7 and described below.

Figure 5:
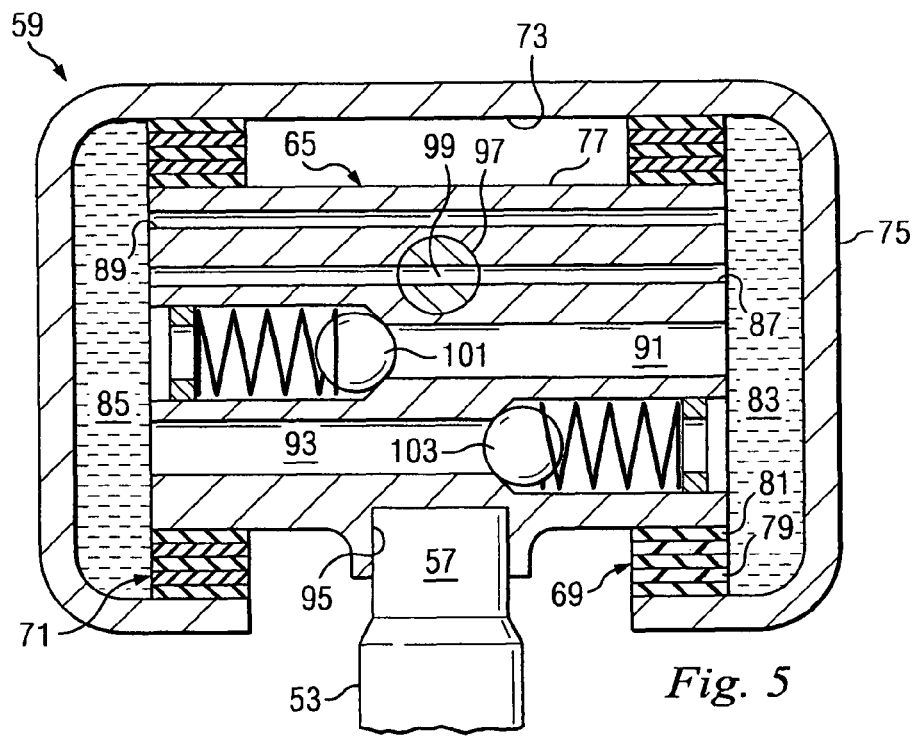
FIG. 5 is a cross-sectional plan view of a dual-spring-rate damper for use in the rotor hubs of the present invention.

Referring to FIG. 5, damper 59 is shown in a cross-sectional plan view Elastomeric seals 69, 71 are fixedly mounted to inner surface 73 of housing 75 and fixedly mounted to outer surface 77 of piston 65. Seals 69, 71 are preferably formed as "sandwich" structures, with alternating layers of an elastomeric material 79 and a rigid, non-elastomeric material 81, such as a metal. This type of structure is nearly incompressible in a direction generally normal to the layers, but the structure allows for a limited amount of shearing motion.

Each seal 69, 71 sealingly engages inner surface 73 and outer surface 77 to form fluid chambers 83, 85 within housing 75. Each fluid chamber 83, 85 is adjacent an end of piston 65 and contains a preferably incompressible fluid, such as a hydraulic fluid or an oil. The fluid may flow between chambers 83, 85 through passages 87, 89, 91, 93 formed in piston 65 and extending from one end of piston 65 to the other end of piston 65. A bore 95 is located on outer surface 77 for receiving inner end 57 of post 53, which extends from elastomeric bearing 47 (FIG. 2).

Primary damping passage 87 has valve means, such as rotary valve 97, for controlling the flow of fluid through primary passage 87. As shown in FIG. 5, valve passage 99 of valve 97 can be aligned with primary passage 87 for allowing fluid to freely flow between chambers 83, 85 through primary passage 87. Valve 97 can be rotated between this "open" and a "closed" position, in which valve passage 99 is rotated out of alignment with primary passage 87, preventing fluid from flowing through passage 87. A secondary passage 89, which is preferably smaller in cross-sectional area than passage 87, extends through piston 65 for communicating chambers 83, 85. Secondary passage 89 does not have valve means, so fluid is allowed to flow between chambers 83, 85 at all times through secondary passage 89. Bypass passages 91, 93 also extend through piston 65 and communicate chambers 83, 85. Each bypass passage 91, 93 has a one-way, spring-biased check valve, items 101 and 103, respectively, for allowing fluid flow through bypass passages 91, 93 only when an overpressure occurs in one of chambers 83, 85. An overpressure in a chamber 83, 85 will overcome the force of the spring in the opposing check valve 101, 103, forcing valve 101, 103 from a seated position in bypass passage 91, 93. Fluid then flows through bypass passage 91, 93 until the overpressure subsides enough to allow bypass valve 101, 103 to seat, stopping the flow of fluid.

FIGS. 6 and 7 illustrate damper 59 in operation. Referring to FIG. 6, damper 59 is shown reacting to a movement of post 53 in the direction shown by arrow 105 when damper is switched to the softer of the two available spring rates. Rotary valve 97 is in the open position, in which valve passage 99 is aligned with passage 87, and this allows fluid to flow between fluid chambers 83, 85 through passage 87. Fluid can also flow between chambers 83, 85 through passage 89. When movement of post 53 causes piston 65 to move relative to housing 75 and toward chamber 85, as is shown in the figure, the movement is resisted by the shear force required to deflect seals 69, 71, which are fixedly attached to housing 75 and to piston 65. The shear force provides a spring rate, $k_{shear}$, for damper 59. In addition, the end of piston 65 adjacent chamber 85 applies pressure to the fluid in chamber 85, forcing the fluid to pass through passages 87, 89, which act as a fluid restriction for damping oscillations of piston 65.

Referring to FIG. 7, damper 59 is shown reacting to a movement of post 53 in the direction shown by arrow 105 when damper is switched to the stiffer of the two available spring rates. Rotary valve 97 is in the closed position, in which valve passage 99 is out of alignment with passage 87, and this prevents fluid flow between fluid chambers 83, 85 through passage 87. Fluid can flow between chambers 83, 85 through passage 89. When movement of post 53 causes piston 65 to move relative to housing 75 and toward chamber 85, as is shown in the figure, the movement is resisted by the force required to bulgingly deflect seals 71, as shown. Because fluid in chamber 85 is restricted to flowing through only secondary passage 89, the fluid pressure caused by piston 65 on the fluid in chamber 85 causes the central portion of seal 71 to bulge outward. The force required provides a spring rate, $k_{bulge}$, for damper 59, $k_{bulge}$, being a higher value than $k_{shear}$. The flow restriction to fluid flowing through passage 89 damps oscillations of piston 65.

Dampers of the invention may have one piston, such as damper 59 (FIG. 4), or may have more than one piston, such as damper 29 (FIG. 1). Dampers 29, 59 preferably have a stroke of approximately +/−1.00 in., though dampers 29, 59 may be constructed in any appropriate size for the particular application. Dampers of the invention are shown as having passages extending through the piston, though passages routed through the damper housing may alternatively be used.

The hub of the invention has several advantages, including: (1) providing a rotor hub having selectively switchable spring rates for lead/lag damping; (2) providing a small, lightweight switchable damper for use in the rotor hubs of the invention; and (3) providing a method of preventing ground resonance conditions while minimizing loads and fatigue on aircraft components.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description.

The invention claimed is:

1. A rotor for a rotary-wing aircraft, the rotor assembly comprising:

a central member;

a plurality of blade attachment members adapted for attaching rotor blades to the central member, the blade attachment members being pivotally attached to the central member and capable of pivoting about a pivot axis generally normal to a plane of rotation of the blades, the pivoting allowing for in-plane motion of the blades relative to the central member; and a damper having a housing and a piston movably carried within the housing, the piston having fluid passages therethrough and valve means for controlling the flow of fluid through at least one of the passages, the piston being sealingly connected to an inner surface of the housing with deformable elements, the deformable elements allowing movement of the piston relative to the housing through elastic shearing of the deformable elements, the deformable elements also being deformable by a force exerted by the piston on a fluid in communication with the deformable elements through bulging deformation of the deformable elements, the valve means allowing for selective switching between a first spring rate, in which elastic shearing provides a dominant spring force, and a second spring rate, in which bulging deformation provides the dominant spring force;

wherein each damper is operably connected to an inner end of each blade attachment member for damping the in-plane motion of the associated blade.

* * * * *